United States Patent Office 3,074,308
Patented Jan. 22, 1963

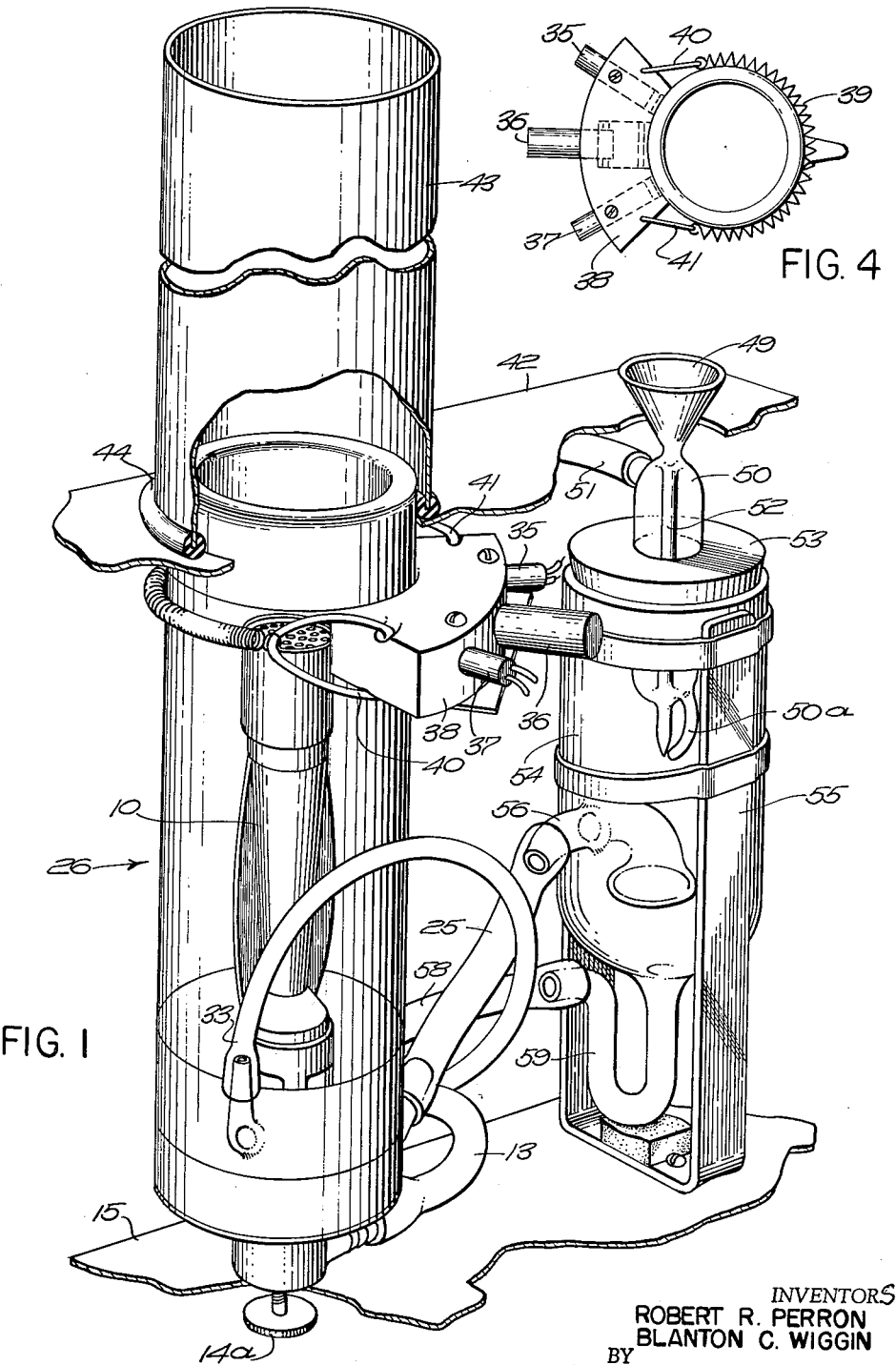

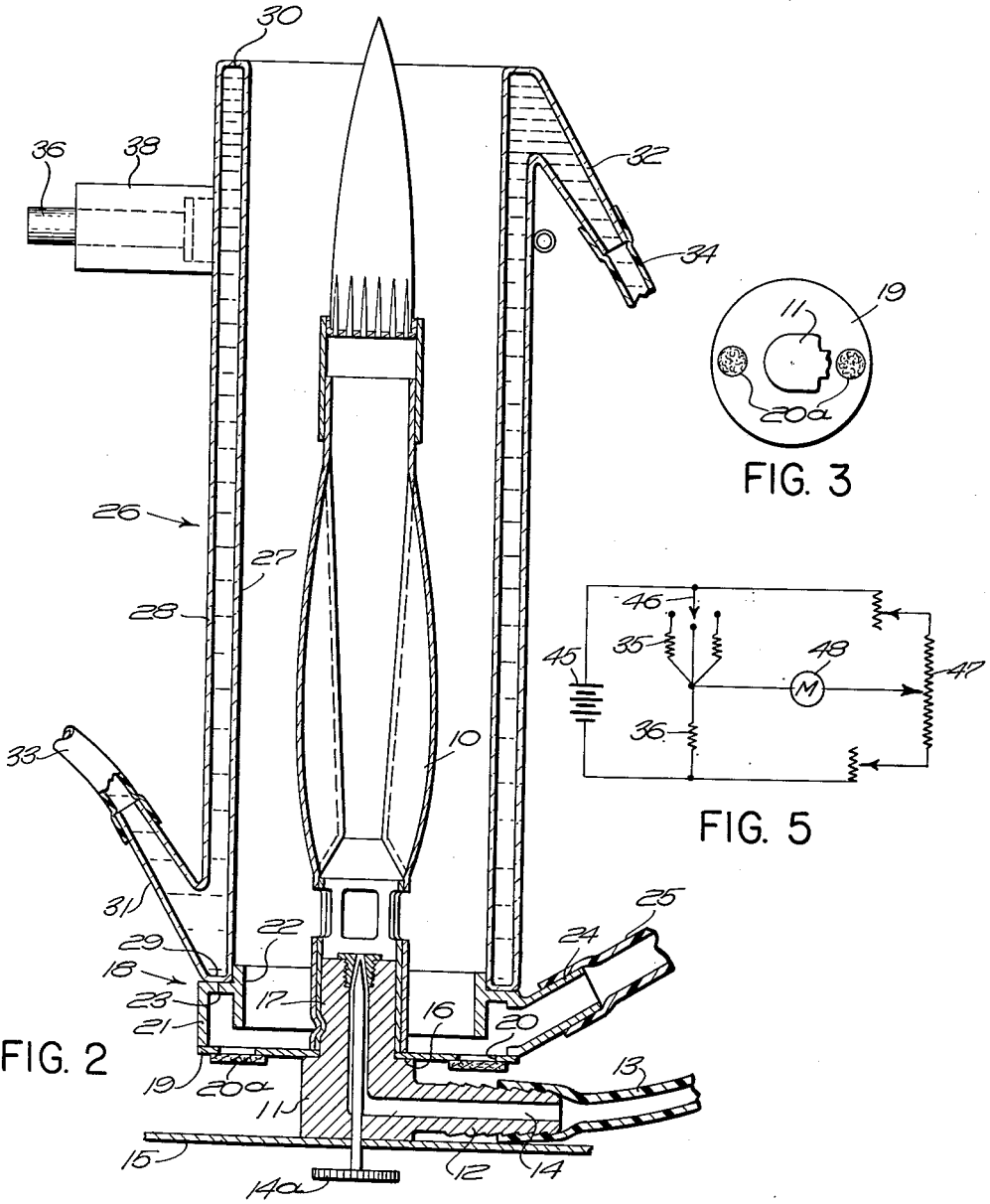

3,074,308
SPECTROMETRY APPARATUS
Robert R. Perron, Beverly, and Blanton C. Wiggin, Wellesley, Mass., assignors to Advanced Instruments, Inc., New Highlands, Mass, a corporation of Massachusetts
Filed Nov. 3, 1958, Ser. No. 771,487
7 Claims. (Cl. 88—14)

This invention relates to spectrometry apparatus, including colorimeters and spectrophotometer and spectroscopy equipment of both emission and absorption types, and being spectral measuring devices used in clinical medicine, medical research, and industrial processes and laboratories for determining the concentration of chemical elements, ions or molecules, such as sodium and potassium, in various common media. In optical emission spectrometry, a sample of the substance being analyzed is excited by an electric arc, spark, discharge tube, gas flame, or other source, and the intensity of the unique pattern of emitted light characteristic of the ionized element or elements, which intensity is a function of the concentration of the elements, is measured by detector means consisting of a photosensitive device, such as film, crystals or phototubes or cells, in association with a monochromating device passing the characteristic spectrum.

This invention provides a novel heat filter rendering emission or absorption spectrometry apparatus free from thermal drift, by insulating the detector means from the unwanted radiant heat of the source. The invention filter may be employed also for eliminating unwanted spectra.

The present invention also provides a flame photometer of improved design and construction, and which is distinguished more particularly by its greater accuracy, improved repeatability, smaller size, and lower cost.

The sensitive measuring instruments here concerned are subject to various sources of drift or error, including radiant or infra-red heating of the detector, heating also of the detector or instrument housing, changes in atmospheric light level due to external sources, and contamination of the source or flame-supporting atmosphere.

To seek elimination of these problems in certain ways inhibits the simplicity and accuracy of the instruments in other ways. Thus the detector can be shielded from the source heat by a sufficient spacing, but at the expense of employing an elaborate system of source light control or external light exclusion, and hence of complicating and enlarging the instrument. Similarly, false signals from atmospheric contaminants can be kept out of the source by sealing it in an artificial atmosphere in which purified gas is introduced first to the sample vaporizer, but at the price of precluding a secondary air supply to the source, and so denying maximum heat and stability to the same.

The reliability of optical spectromerty devices such as flame photometers is also decreased by their use of detector cells of the red-sensitive barrier-layer or photovoltaic class, the measurement of whose signal requires a galvanometer of a bulky and expensive type, and which is very fragile and also vibration sensitive in that it employs a delicate hair-like coil suspension which is easily broken. The photovoltaic cells are known also to be deteriorated by and difficult to seal off from mercury vapor and moisture, and to exhibit instability or E.M.F. shift at the low-light level at least of a relatively cool flame.

These and other difficulties and disadvantages are overcome under the invention by the provision novelly of a fluid flowing filter chamber adapted to be positioned adjacent the source and between it and the detector means. In a preferred embodiment the filter comprises more particularly a transparent liquid and gas conducting jacket arranged to proximately surround the source. The unique filter or fluid jacket of the invention affords the spectral measuring device greater accuracy and repeatability by absorbing or effectively filtering the unwanted radiant heat and/or unwanted spectrum of the source; and hence by its passing only the desired spectral energy, the instrument is prevented from being excessively heated, and the detectors are maintained at a relatively constant temperature and free from thermal drift.

The provision of the heat filter or fluid jacket makes possible also a significant reduction in the size of the instrument, in that the detector is brought much closer to the source, for optimum exposure to a light beam from which the unwanted heat energy has been effectively filtered.

The spectroscopy apparatus of this invention novelly employs also a photoresistive type of detector cell. Such cells are much less expensive than the photovoltaic cells, which are made red-sensitive by special processes. The change of resistance of the photoresisitive or photoconductive cell is measured much more accurately and with much less expensive and delicate instruments than is the change of potential of the barrier-layer cell. Further, photoresistive cells are known to exhibit much greater inherent stability than the photovoltaic type, thus additionally enhancing the repeatability and calibration accuracy of the invention device. Still further, for reading the signal of the photoresistive detector there is required only a simple ohmmeter, in lieu of the separately boxed, bulky and expensive galvanometer used with the barrier-layer cells. And in the invention apparatus the photoresistive cells are insulated also from mercury vapor and moisture.

Emission spectroscopy in accordance with this invention is further distinguished by the elimination of the usual baffles and traps for excluding extraneous light from the chamber or casing in which the detector cells are housed, and the elimination also of the system of precision collimating lenses and/or mirrors by which source light is channeled or beamed to the detectors. In the invention apparatus the heat sensitive and otherwise precluded photoresistive cells are arranged much more compactly with respect to the source than is possible with the usual light traps and lenses. More particularly, the detectors or cells are mounted right inside the same housing as the source, and may be on or near the heat and spectral filtering jacket, which is in close proximity to the source.

The accuracy and repeatability of the present instrument is increased still further by the use of a unique source mounting assembly or manifold by which the source is not sealed off from atmospheric air, but which admits both the pressure air from the atomizer and secondary air from the external atmosphere, whereby to maintain the source at maximum heat and stability. The secondary or atmospheric air admitting means are filtered to render the instrument impervious to tobacco smoke and other contaminants.

The invention will be better understood from a consideration of the following specification taken in conjunction with the accompanying drawings in which:

FIG. 1 is an assembly view of the photometer and fluid filter of the invention;

FIG. 2 is a vertical section of the photometer burner and the filter fluid jacket;

FIG. 3 is a bottom plan of the burner manifold;

FIG. 4 is a top plan of the filter jacket and detector assembly; and

FIG. 5 shows schematically the electrical circuit of the detector means of the invention.

In the form or embodiment selected for illustration herein the invention photometer comprises a standard gas burner 10, which may be of the Meker type, and which is fitted for city or bottled gas operation. To that end the burner is supported on a base or casting 11 having a nipple 12 tapered and ribbed or otherwise formed for sealing seizure by the usual gas line 13, and provided also with a supply passage 14 through which the gas may be fed to the burner, as regulated by a needle valve 14a. The burner base 11 is supported at a flat underface on the bottom wall 15 of the instrument housing or bonnet, through which bottom wall 15 the gas valve 14a is seen to project for external access and manipulation.

The burner base 11 is formed also and above nipple 12 with an annular shoulder 16 surmounted by an upstanding reduced annular neck or stem 17.

A burner manifold 18 is arranged around the burner base 11 and comprises an annular metal or other rigid heat resistant plate 19 formed with a central opening receiving and fitting closely around stem 17, and whereby the plate is seated on base shoulder 16, to which it is fixed by a suitable adhesive. The manifold plate 19 is formed also with secondary or atmospheric air openings or ports 20 of suitable number and size, herein two ports of 3/16 inch diameter, and filters 20a cut from suitable material, such as a porous submicron cellulose, are laid over and bonded to these openings, whereby the instrument is impervious to tobacco smoke, soap powder, dust and other contaminants.

The burner manifold 18 comprises further a wide metal ring 21 which may be of the same material and size as and which is supported and sealed at its bottom edge to the plate 19. A second ring 22 of similar width but smaller diameter is mounted concentric with the ring 21, and more particularly is engaged and supported intermediate its ends by a disc ring 23 joined to larger ring 21 at the upper edge of the same, and whereby to define with said rings an annular shoulder or step. The small ring 22 is seen also and at its lower edge to be spaced from plate 19, with which it defines an annular chamber through which the secondary air and the vaporized sample are supplied to the burner. For admitting the sample, ring 21 is provided with a port or stem 24 opening therethrough and to which atomizer line 25 is coupled.

As herein shown as applied to the invention photometer, the heat or spectrum filter of the invention comprises a fluid jacket 26 surrounding the burner 10 and having sealed seating on manifold 18. The heat and spectral filter or fluid jacket 26 comprises an annular open ended sleeve or tube having double or inner and outer cylindrical side walls 27, 28 spanned or bridged at the termini of their equal lengths by flat lateral end walls 29, 30 normal to said side walls and defining therewith a fluid conducting envelope. The fluid confining and flowing jacket 26 is provided also with inlet and outlet openings or ports through its outer wall 28 from which integrally project short stems or tubes 31, 32, fitting said jacket ports for coupling to supply and discharge conduits or hoses 33, 34. The port tubes 31, 32 are positioned adjacent the ends of and diametrically opposed on jacket 26, and they are seen also to incline inwardly in opposite parallel directions.

The invention jacket may be molded or cast or otherwise formed to the desired integral, fluid tight construction, and it is formed from a material which is rigid and heat resistant. The filter jacket hereof is adapted either or both by its material of construction and by selection of the fluid to be flowed therethrough for its described function of passing the wanted spectra and filtering the unwanted heat and spectra of the source. Thus the jacket may be made of colored Corning type or Jena type optical filter glass, selected from the available wave lengths and types, or it may be of annealed Pyrex glass. Similarly the fluid to be flowed through the jacket may be a selected spectrum filtering liquid such as cadmium chloride solution which filters 7700 A. (potassium) and above, or the fluid may be tap water.

In accordance with the invention, the described spectrum filtering is afforded the jacket at least in that part which intersects the optical path of the observed or detected radiation.

For the desired close sealing fit with manifold 18, and more particularly on ring 23 and against ring 22 thereof, the jacket 26 must be accurately formed at least at its ends with an inside diameter close to but not less than the outside diameter of the ring 22. Similarly, and for its uniform specing around the burner 10 the jacket should be ground at both ends 29, 30 to, say, within 1° of the vertical, whereby said ends will sit flat and firmly on the disc 23.

In the illustrative embodiment hereof, the filter jacket 26 may have a height, say, 7 inches, to enclose the burner 10 and also the observed region of its flame; a diameter, say, 2 inches, affording desired all-around clearance with and air supply to the flame; and a side wall spacing sufficient to provide the desired fluid layer. The jacket is seen to project through a larger opening in the bonnet top 42, and there to be engaged by a chimney which carries off the exhaust gases and unconsumed sample, and comprises a black tube 43 sealing the opening and seated also on the top by a splash ring 44 received over its lower rim.

The detector means of the invention are shown in FIGS. 1, 2, and 4 as a pair of sodium and potassium or other sample detectors 35, 37 and a lithium or other reference detector 36 which will be understood to be fitted with the usual color filters. The detectors, herein photocells 35, 36, 37, are mounted in a holder 38 comprising a rubber or similar solid block having a face shaped or rounded conformantly to the jacket 26 and which is recessed to provide lateral photocell receiving and enclosing chambers extending radially of said jacket, whereby the photocells are aligned with the light beams emanating from the burner.

In accordance with the invention the photocells 35, 36, 37 are hermetically sealed by enclosing them in a glass or similar non-vapor-permeable envelope whereby the cells are insulated from mercury vapor and moisture. The photocell holder 38 is supported adjacent the burner 10, and is conveniently as herein mounted on the jacket 26, as by a spring 39 stretched around the jacket and anchored to clips 40, 41 pivoted through the holder ends.

The cells 35, 36, 37 will be understood to be insulated against thermal drift by the jacket 26 notwithstanding they are mounted in close proximity to, herein 1 in. from, the flame rather than at the usual, say 6 in. spacing. It will be appreciated also that the eliminating of the external light trapping and flame light directing systems required by such spacing and of the special housing necessitated for such systems permits a very significant reduction in size of the invention photometer, which may be 8 in. as compared with the usual 13 to 30 in. in length, thus saving needed laboratory bench space.

The mentioned heat-insulation of the photocells permits the selection of the much smaller and more stable, sensitive and sturdy photoresistive or photoconductive type cell for the photometer detector. In accordance with the invention, then, the cells 35, 36, 37 are of the photoresistive type to which a potential is applied, and which generate resistance changes responsive to light changes. Thus another feature of the invention apparatus is that its detector output may be measured by a standard ohmmeter rather than the delicate, expensive separately-housed galvanometer required with barrier layer cells.

The photometer detector is of the double beam type by which error due to variation in input signal is eliminated. That is, sample cells 35, 37 are alternately connected to look at an unknown component beam simultaneously with the exposure of reference cell 36 to a known standard beam, and in a null balance circuit which compares the photocell outputs. The ratio of the photocell signals remains constant despite variations in flame intensity because such variations are reflected equally in both beams.

To this end the sample solution is first diluted with an internal standard, a uniform amount of a non-interfering linear ion such as lithium whose emission is detected by the reference cell 36.

A representative circuit in which the photoresistive cells may be connected for null balance operation is schematically shown in FIG. 5. A source of potential 45 is connected to supply the sample cells 35, 37 alternately, as through a switch 46. The sodium and potassium or other sample cells 35, 37 are connected in series with lithium or other reference cells 36, and in parallel with an adjusting potentiometer 47. A null indicator such as a microammeter 48 is connected between the junction of the cells and said potentiometer 47, and the unknown concentration is obtained by potentiometer adjustment to balance the circuit.

Referring now more particularly to FIG. 1, the sample liquid or solution to be analyzed is poured into a funnel 49 which for convenient access projects upwardly through the bonnet top 42. The funnel 49 is carried by a pressure chamber 50 having an inlet to which an air hose 51 is coupled. The sample solution is dripped through a capillary tube 52 extending through chamber 50 and is atomized or formed into a fine spray by the air jet from the chamber outlet nozzle 50a. The chamber 50 is sealed through a stopper 53 which is in turn seized in a jar 54 strapped in a supporting bracket 55 mounted on the bonnet base. The suction produced by the burner 10 draws off the vaporized sample through an inverted bell housing 56 to which the burner line 25 is connected, and that excess of the test solution which is not vaporized forms droplets which run down the wall of jar 54 to dependent U-tube trap 59 which is water filled, and from which the displaced fluid is carried off by drain hose 58.

In the application of the heat and spectrum filtering jacket 26 the same is coupled or connected for flowing of a suitable fluid therethrough before the source is activated, as, in the photometer hereof, before the flame is ignited. In this, connection is made to a gas or liquid supply, as a water tap, always by bottom hose 33, and the top hose 34 is arranged to drain to a sink preferably by an exposed stream, whereby the continuing flow may be seen and heard. The flow is preferably adjusted to a rate at which the discharge is not measurably warmer than the input to the water jacket, which may require a modest 1-5 pints per minute.

It will be appreciated that operation of the fluid filter jacket does not require access to a tap and sink, and that the apparatus may be made self-contained as to its liquid or gas supply by employing in lieu thereof a tank and circulating pump.

It will be understood also that no special room is needed for the invention photometer, which operates in smoke. More particularly and by the described filter-fitted manifold 18 and jacket 26, the apparatus is made impervious to the tobacco smoke, soap powder, and dust of the open laboratory. Thus there is provided a pure flame, which is supplied by the gas from line 13, the air carrying the atomized sample through line 25, and the secondary air through ports 20. It wil be appreciated that high stability and intensity is afforded the flame by the admission of the atmospheric air through the manifold opening 20 and as purified by filters 20a. This provision under the invention of a secondary air source assures the burner all the air needed to support optimum combustion.

Our invention is not limited to the particular embodiments thereof illustrated an described herein, and we set forth its scope in our following claims.

We claim:

1. In an optical spectrometry apparatus, in combination, a gas burner; a double walled, open ended fluid jacket closely surrounding said burner and arranged to intersect the radiant beam of its observed flame; means for upstanding support of said gas burner and fluid jacket, said means fitted for admitting gas from a supply to said burner and for admitting fluid from a sample through the lower end of said jacket, said supporting means constructed and arranged also to control the admitting through the jacket lower end for high stability and intensity of the burner flame; means fitting the jacket for coupling to fluid supply and discharge conduits, whereby said fluid jacket is operative upon the flowing of fluid therethrough to filter the unwanted spectrum of and also to insulate the heat of said flame; a plurality of compact, stable, sensitive detector cells of the photoresistive type generating resistance changes responsive to source changes and whose output may be measured by a standard ohmmeter; a non-vapor-permeable envelope hermetically sealing said photoresistive detector cells; means for supporting said cells and envelope against the outside of said jacket in alignment with the radiant beam of said flame, the cells thereby mounted in close proximity to the flame yet maintained at substantially constant temperature; and detector circuit means for applying a potential to said photoresistive cells and for comparing the resistance changes which they produce responsive to flame changes.

2. In an optical spectrometry apparatus, in combination, a gas burner; a double walled, open ended fluid jacket closely surrounding said burner and arranged to intersect the radiant beam of its observed flame; means for upstanding support of said gas burner and fluid jacket, said means fitted for admitting gas from a supply to said burner and for admitting fluid from a sample through the lower end of said jacket, said supporting means constructed and arranged also to control the admitting through the jacket lower end for high stability and intensity of the burner flame; means fitting the jacket for coupling to fluid supply and discharge conduits, whereby said fluid jacket is operative upon the flowing of fluid therethrough to filter the unwanted spectrum of and also to insulate the heat of said flame; a plurality of compact, stable, sensitive detector cells of the photoresistive type generating resistance changes responsive to flame changes and whose output may be measured by a standard ohmmeter; a non-vapor-permeable envelope hermetically sealing said photoresistive detector cells; a solid block having a face shaped conformantly to said jacket and having lateral recesses extending radially of said flame and in which are received said cells and envelope; means for supporting said block with said face pressed against the side of said jacket and with said cells in alignment with the radiant beam of said flame and maintained at substantially constant temperature and free from thermal drift; and detector circuit means for applying a potential to said photoresistive cells and for comparing the resistance changes which they produce responsive to flame changes.

3. In an optical spectrometry apparatus, in combination, a gas burner; a base supporting said burner and having a connection and passage for conducting gas from a supply to the burner; a manifold engaged around the base, said manifold constructed and arranged to define a chamber generally closed to the external atmosphere and having an all-around inward opening communicating with said burner; means fitting the manifold for connection to a sample fluid supply and for admitting a sample fluid to said chamber; means aperturing the manifold also for secondary air opening of said chamber to the external atmosphere and so as to admit atmospheric air in manner and extent to maintain high stability and intensity of the burner flame, the atmospheric air combining in said chamber with said sample fluid and passing with it through said inward opening; means associated with said manifold for filtering out any contaminants from said atmospheric air; and a filter chamber proximately enclosing said burner and sealingly seated on said manifold, the filter chamber defining an open ended double walled sleeve adapted to contain and conduct filter fluid across the radiant path of the observed portion of the burner flame and having inlet and outlet fittings for supply and discharge of said filter fluid, and said jacket and filter fluid filtering the unwanted radiant heat of said flame such that detector means may be mounted and maintained adjacent said sleeve and for the observing proximately-directly of but without excessive heating by said flame.

4. In an optical spectrometry apparatus, in combination, a gas burner; a base supporting said burner and having a connection and passage for conducting gas from a supply to the burner, said base formed also with a reduced upstanding stem mounting the burner and defining therearound a shoulder; a plate engaged around the base and having a central opening fitting closely around said stem and sealingly seated on said shoulder, said plate having also one or more openings to and admitting secondary air from the external atmosphere; filter means at said secondary air openings; a pair of concentric rings, the outer ring supported on said plate and surrounding said openings and the inner ring supported above said plate by a disc spanning and closing between the top of the outer ring and an intermediate annulus of the inner ring and whereby to define with that an annular step; means at and opening through said outer ring and fitted for connection to a sample fluid supply; said plate, rings, and disc defining a chamber in which said fluid sample is mixed with said secondary air from which the sample-air mixture may exit inwardly beneath said inner ring and for passage upwardly to said burner; and a fluid conducting heat filtering jacket proximately surrounding the burner and the flame thereof and sealingly seated on said annular step, the jacket formed as an open ended double walled sleeve adapted to contain and conduct filter fluid across the radiant path of the observed portion of the burner flame and having inlet and outlet fittings for supply and discharge of said filter fluid, and said jacket and filter fluid filtering the unwanted radiant heat of said flame such that detector means may be mounted and maintained adjacent said sleeve and for the observing proximately-directly of but without excessive heating by said flame.

5. In an optical spectrometry apparatus, in combination, a gas burner; a base supporting said burner and having a connection and passage for conducting gas from a supply to the burner; a manifold constructed and arranged to define a chamber generally closed to the external atmosphere and having an inward opening communicating with said burner; means fitting the manifold for connection to a sample fluid supply and for admitting a sample fluid to said chamber; means aperturing the manifold also for secondary air opening of said chamber to the external atmosphere and so as to admit atmospheric air in manner and extent to maintain high stability and intensity of the burner flame, the atmospheric air combining in said chamber with said sample fluid and passing with it through said inward opening; means associated with said manifold for filtering out any contaminants from said atmospheric air; and a filter jacket proximately surrounding said burner and seated on said manifold, said filter jacket comprising an annular open ended sleeve having concentric inner and outer side walls intersecting the radiant path of the observed region of the burner flame and bridged at their ends by flat lateral end walls defining with said side walls a closed fluid storing envelope, and diametrically opposed port stems projecting adjacent the ends of the outer of said walls in opposite parallel directions and for supply and discharge of fluid the flowing of which through said sleeve filters the unwanted radiation of said flame and such that detector means may be mounted and maintained adjacent said sleeve for the observing proximately-directly of but without excessive heating by said flame.

6. The apparatus of claim 5 wherein the fluid filter jacket is constructed of glass and is about two inches in diameter.

7. In an optical spectrometry apparatus, in combination, a gas burner; a base supporting said burner and having a connection and passage for conducting gas from a supply to the burner; a manifold arranged around the base, said manifold constructed and arranged generally to define a sealed surrounding chamber opening only inwardly to said burner; means fitting the manifold for connection to a sample fluid supply and for admitting a sample fluid to said chamber; means aperturing the manifold also for secondary air opening of said chamber to the external atmosphere and so as to admit atmospheric air for combining with said gas in said chamber and which exits inwardly from said chamber and passes upwardly to said burner to maintain high stability and intensity of its flame; filter means at said secondary air openings and filtering out any contaminants from the atmospheric air; and a filter jacket arranged around and proximate to the burner and the observed region of its flame and sealingly seated on the manifold, said filter jacket comprising an open ended double walled fluid tight sleeve having inlet and outlet fittings for supply and discharge of a filtering fluid and arranged for conducting the fluid to intersect the observed radiation of said flame; photoresistive cell means for detecting said radiation of said flame; and means for supporting said photoresistive cell means outside and immediately against said filter jacket and so as to perform said detecting without the use of light trapping or directing means.

References Cited in the file of this patent
UNITED STATES PATENTS

| | | |
|---|---|---|
| 1,790,086 | Boerstler | Jan. 27, 1931 |
| 1,895,887 | Lorenz | Jan. 31, 1933 |
| 2,335,655 | Dickey | Nov. 30, 1943 |
| 2,643,574 | Todd | June 30, 1953 |
| 2,664,779 | White | Jan. 5, 1954 |